United States Patent [19]

Walewski

[11] Patent Number: 4,546,142

[45] Date of Patent: Oct. 8, 1985

[54] INHIBITING STYRENE EMISSIONS IN UNSATURATED POLYESTER RESINS

[75] Inventor: Leonard M. Walewski, Staten Island, N.Y.

[73] Assignee: United States Steel Corporation, Pittsburgh, Pa.

[21] Appl. No.: 689,697

[22] Filed: Jan. 8, 1985

[51] Int. Cl.[4] .......................... C08L 91/08; C08K 5/01

[52] U.S. Cl. .................................... 524/487; 524/601; 525/36; 528/303; 528/306

[58] Field of Search .................. 528/303, 306; 525/36; 524/487, 601

[56] References Cited

U.S. PATENT DOCUMENTS 4,180,635 12/1979 Fischer et al. .................. 528/303 X
4,269,745 5/1981 Neumann .......................... 525/36 X
4,292,218 9/1981 Corrado et al. ................ 528/303 X
4,294,734 10/1981 Corrado et al. ................ 528/303 X
4,294,748 10/1981 Corrado et al. ................ 528/303 X
4,296,009 10/1981 Kerle et al. ......................... 523/518
4,336,169 6/1982 Hamer et al. ....................... 523/511
4,387,171 6/1983 Russell ............................... 523/518

OTHER PUBLICATIONS

Perry Nylander, "Development of a Resin System to Reduce Styrene Evaporation", 1979, pp. 1-11, (Section 6-B).

*Primary Examiner*—Lucille M. Phynes
*Attorney, Agent, or Firm*—W. L. Krayer

[57] ABSTRACT

An unsaturated polyester exhibiting low styrene emissions comprises conventional phthalic and maleic anhydrides together with specific amounts of diethylene glycol, styrene, and a particular type of paraffin wax.

2 Claims, No Drawings

INHIBITING STYRENE EMISSIONS IN UNSATURATED POLYESTER RESINS

BACKGROUND OF THE INVENTION

This invention is a new unsaturated polyester resin which exhibits a significantly lower rate of styrene emissions than heretofore was considered possible or economically acceptable.

The unique blend of properties in my resin provides significant reductions in styrene monomer emission levels coupled with mechanical properties at least equal to conventional laminating resins while exhibiting excellent glass wet-out. In addition the resin also provides higher product yields for the end user.

The demand for improved workplace environments coupled with the industry's interest in advancing technology have created a challenge to the polyester chemist which has, up to now, usually necessitated trade offs between one physical property and another. At best, current polyester laminating resin technology has fallen short of providing the industry with a low styrene emission polyester resin possessing mechanical properties equal to conventional laminating resins. Indeed, previously existing low styrene emission resins generally threatened mechanical and glass wet-out properties and exhibited reductions in secondary bonding characterics. A low styrene emission polyester resin which also exhibits good properties such as my new resin described herein represents a real improvement in technology.

The recent recommendation to OSHA by NIOSH of a 50 ppm styrene monomer workplace limit (down from 100 ppm) may lead to a requirement of significant capital investments by many fabricators. The potential economic significance of a high performance, low styrene emission polyester resin should not, therefore, be underestimated.

Conventional unsaturated polyester laminating resins, while exhibiting excellent secondary bonding and good mechanical properties, may contribute high styrene monomer levels to the workplace environment. Historically, low styrene monomer emission technology has centered around more or less conventional additives acting as suppressants. Unfortunately, these suppressants can decrease interlaminar adhesion, particularly if the resins are not handled carefully during application. More recently the use of paraffin wax has been proposed to decrease styrene emissions. See the 1979 SPI paper by Nylander (Section 6-B). U.S. Pat. Nos. 4,336,169 and 4,387,171 disclose the use of certain additives to overcome certain disadvantages of using paraffins in polyesters.

SUMMARY OF THE INVENTION

We are aware that certain formulations described in U.S. Pat. Nos. 4,294,748, 4,292,218, 4,294,734 achieve somewhat inhibited styrene emissions; however, my formulation differs in two significant respects from these patents. We have found that the use of diethylene glycol in the substantial absence of dipropylene glycol, and in the presence of a paraffin wax having a melting point of about 140°-145° F., will significantly improve the styrene emission results.

A simple method was developed to measure emissions and thereby screen resin candidates. The method involves measurement of styrene monomer loss from a curing resin sample with a known surface area. When measuring emissions in this manner, conventional polyester resins generally are found to emit more then 100 grams per square meter.

My low styrene emission ("LSE") resin permits not only an initial 20% reduction in resin styrene monomer content but also allows the maintenance and in some cases the improvement of fabricated reinforced plastic ("RP") RP laminate physical properties. A comparison of the physical properties of RP laminates prepared with a conventional polyester laminating resin and my new LSE resin is shown in Table I. It will be noted that the physical properties of an RP laminate prepared with the new LSE resin are equal to or better than those prepared with the conventional resin. The conventional resin used comprised 84 mole percent propylene glycol, 22 mole percent diethylene glycol, 40 mole percent maleic anhydride and 60 mole percent phthalic anhydride; this composition was dissolved in styrene in a 66:44 weight ratio.

In addition to matching or improving the physical properties of the RP laminate using the new LSE resin, it was deemed equally important to match the liquid properties of the conventional laminating resin. This aspect was of importance in order to reduce or eliminate the normal adjustment period experienced by the industry in handling a new product. The results of this effort yielded an almost perfect match to the conventional resin now in use in the industry. A comparison of the liquid resin properties is shown in Table II.

The new LSE resins also exhibit excellent glass wet-out which improves productivity by reducing roll-out time. In addition, the new resins exhibit no reduction in laminate mechanical properties and no loss of secondary bonding characteristics.

The most notable benefit of this new family of LSE resins is in significantly reduced styrene monomer emissions without a significant sacrifice of other properties. As earlier stated, conventional polyester laminating resins typically exhibit 100+gm/m$^2$ emissions during cure. The resin utilized in the preparation of the RP test laminates measured 99 gm/m$^2$ while the new LSE resin (the formula of Example I) exhibited a 70% reduction to only 30 gm/m$^2$.

It is important to take into consideration the atmospheric conditions at the time of testing styrene emissions. The temperature and relative humidity are among the most important factors in this type of testing. The values reported herein for styrene emissions were obtained at a room temperature of about 73° F. with the relative humidity at 74%. For good comparative results, all samples to be screened should be tested on the same day using appropriate control samples for standards or alternatively but more expensively tested in a constant controlled atmospheric environment.

The procedure utilized was as follows:

1. A circular disc mold (14.5 cm in diameter) was weighed to the nearest 0.01 gram.

2. 120 grams of resin was catalyzed and mixed for one minute. Exactly 100.0 grams of catalyzed resin was then poured into the pre-weighed disc mold.

3. After the resin gelled and the exotherm subsided, the disc mold was again weighed with the cured resin included.

4. The difference in weight, in grams, between the disc mold with the liquid resin and the disc mold with the fully cured resin was calculated to be the weight loss of styrene.

5. With the size disc mold used in the testing, the number of grams lost as determined in step 4 was divided by a factor of 0.0165 to determine the emission in grams/m². (See Table III.) The results, which were repeated many times, indicate the new LSE resin manifested a 60–70% decrease in emission levels.

As earlier indicated, achieving low styrene emission levels may not have economic appeal unless good secondary bonding of the laminate can be maintained, e.g. unless the resin works for its intended purpose. The test procedure used to determine this property is described below.

1. Construction of the laminate
   A. A one-ply resin-rich laminate (approximately 15% glass - 1½ oz. mat) was allowed to cure at room temperature for 24 hours.
   B. A parting film was then placed at one end of the laminate before a three-ply (1½ oz. mat) 25% glass laminate was placed on top of the cured laminates and again allowed to cure for 24 hours.
2. Bond Test
   A screwdriver was used to separate the 2 layers of the laminate at the parting film. Bonding effectiveness is considered proportional to the amount of glass rupture.

My formulation has consistently shown excellent bonding results. During the last stage of laminate construction for the secondary bond test the conventional resin had a "normal" appearance (good glass wet-out, with minimal excess resin on the surface). During the same stage of construction using the new LSE resin, it was noticed there was not only good glass wet-out but in fact the surface was quite resin rich. This phenomenon was noted each time a laminate was constructed using the new LSE resins. Generally less of my LSE resin may be used to achieve wet-out equal to a conventional polyester resin. The combination of lower styrene emission and reduced roll-out time in my LSE resins represents a significant improvement in polyester technology.

TABLE I

Physical Properties - ⅛" RP Laminate (3 Plies of 1½ oz. Glass Mat - 30% Glass)

| | Conventional Polyester Laminating Resin | New LSE Polyester Resin* |
|---|---|---|
| Flexural Strength (PSI) | 25,600 | 27,600 |
| Flexural Modulus (PSI) | 712,000 | 689,000 |
| Tensile Strength (PSI) | 15,900 | 17,200 |
| Tensile Modulus (PSI) | 929,000 | 900,000 |
| % Elongation | 2.5 | 2.6 |
| Barcol Hardness | 45-50 | 45-50 |

*Made according to Example I

TABLE II

Wet Properties of Resins

| | Conventional Polyester Laminating Resin | New LSE Polyester Resin* |
|---|---|---|
| Styrene Content | 44% | 36% |
| Viscosity (Unthixed) @ 77° F. RVF SP #1 @ 20 rpm | 170 cps | 175 cps |
| Viscosity (with Thixotrope) @ 77° F. | | |
| RVF #2 @ 20 rpm | 680 cps | 670 cps |
| @ 2 rpm | 1900 cps | 2000 cps |
| Thixotropic Index | 2.8 | 3.0 |
| Gel Time @ 77° F. (1.25% MEKP) Gel Time | 23.7 min | 22.6 min |
| Gel to Peak | 10.0 min | 8.0 min |
| Peak Exotherm | 301° F. | 318° F. |

*Made according to Example I

TABLE III

Emission Calculation Procedure

Converting Grams Emitted From Disc Mold to Grams/M²

$$\text{GRAMS/M}^2 = \frac{\text{WEIGHT LOSS (IN GRAMS)}}{\text{AREA OF MOLD (IN SQ. M.)}}$$

For this study the diameter of the circular mold was 14.5 CM. Therefore the area=165 CM²=0.0165M². If 0.49 grams of styrene was emitted during cure of casting then grams/M²=0.49/0.0165=30 (Reported to nearest whole number)

Comparisons were also made with compositions representative of those described in U.S. Pat. Nos. 4,294,734, 4,292,218 and 4,294,748, i.e. using the dipropylene glycol specified in those patents instead of the diethylene glycol of Example I. In these comparisons, the compositions of Example I were used to represent my invention. Styrene emissions from my composition were measured at 29 grams/m², compared to 38 grams/m² for the DPG-containing formula.

EXAMPLE I

The following materials were mixed:

| | |
|---|---|
| diethyene glycol | 2465 g |
| maleic anhydride | 1398 |
| phthalic anhydride | 1137 |
| hydroquinone | 0.27 g |

This mixture was cooked at 200° C. and processed to a Gardner Viscosity of I-J (with 30% methyl cellosolve) and a base acid number of 30 to 40. It was then blended with 1500 g of styrene and, when cooled to 110°–130° F., the wax (see below) was added in a molten state, followed by the other ingredients below.

The following materials were added to 100 parts of the styrene containing resin:

| | % by weight |
|---|---|
| Aerosil 200 (thixotrope) | 0.8% |
| Cobalt 12% | 0.1% |
| Dimethylaniline | 0.2% |
| Modifier H | 0.04% |
| Moore & Munger R-0845 Wax | 0.05% |

This wax has the following characteristics:

| | |
|---|---|
| Congealing Point (°F.) (ASTM D 938) | 146 |
| Melting point (°F.) (ASTM D 87) | 145 |

-continued

| Needle Penetration (mm/10) | |
|---|---|
| (ASTM D 1321) @ 77° F. | 13 |
| @ 100° F. | 35 |
| Color, Saybolt (ASTM D 156) | +28 |
| Oil Content (%) (ASTM D 721) | 0.4 |
| Odor (0-4 Scale) (ASTM D 1833) | 1.0 |
| Viscosity, Kinematic, 210° F. (CS) (ASTM D 445) | 5.0 |
| Viscosity, Saybolt, 210° F. (SUS) (ASTM D 88) | 42 |

The material used for comparison was made according to Example II.

EXAMPLE II

This Example is identical to Example I except that dipropylene glycol was substituted for the diethylene glycol (by mole %).

I employ in my formulation a paraffin wax having a melting point of about 140°-145° F. I have determined that waxes having a melting point outside of this range will not perform adequately at the low concentrations necessary to maintain good bonding and physical properties while inhibiting styrene emissions. An example of such wax is "R-0845" of Moore & Munger, Inc. Preferably the wax will have a relatively high concentration of straight chains and will be relatively less soluble in styrene because of a relative absence of branching. I believe that the wax inhibits styrene emission because it tends to precipitate and/or solidify after a small quantity of styrene has evaporated from the surface of the resin.

I have found that certain of the steps specified in Example I are necessary to the accomplishments of my invention, e.g. low styrene emissions together with the maintenance of good physical properties. The wax should be melted before it is added, and the addition of the wax should be made at a resin temperature of about 110° to about 130° F.

I claim:

1. Unsaturated polyester composition comprising (A) about 62 to about 67% by weight of a base resin consisting essentially of about 100 to about 120 mole % diethylene glycol about 55 to about 75 mole % maleic anhydride about 25 to about 45 mole % phthalic anhydride about 0.05 to about 0.25 weight % paraffin wax having a melting point of about 140° to about 145° F., and (B) about 33 to about 38%, by weight, of styrene.

2. The composition of claim 1 made by a process wherein the wax is added, in a molten state, to the cooked resin dissolved in styrene, at a temperature of about 110° to about 130° F.

* * * * *